(12) United States Patent
Kim et al.

(10) Patent No.: US 6,735,262 B1
(45) Date of Patent: May 11, 2004

(54) APPARATUS AND METHOD OF DECISION-DIRECTED CARRIER RECOVERY BASED ON LMS METHOD

(75) Inventors: Myung Sup Kim, Taejon (KR); Jin Suk Seong, Taejon (KR); Deock Gil Oh, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/498,831

(22) Filed: Feb. 4, 2000

(30) Foreign Application Priority Data

Dec. 3, 1999 (KR) .......................................... 1999-54895

(51) Int. Cl.[7] .......................... H04L 27/14; H04L 27/22
(52) U.S. Cl. ...................................... 375/326; 375/346
(58) Field of Search ................................ 375/137, 326, 375/327, 346; 329/307, 308

(56) References Cited

U.S. PATENT DOCUMENTS

| | | | | | |
|---|---|---|---|---|---|
| 4,513,428 | A | * | 4/1985 | Roeder ........................ | 375/376 |
| 5,245,611 | A | | 9/1993 | Ling et al. ................ | 370/100.1 |
| 5,361,276 | A | * | 11/1994 | Subramanian ............... | 375/150 |
| 5,432,819 | A | * | 7/1995 | Mui ............................ | 375/329 |
| 6,072,841 | A | * | 6/2000 | Rahnema ..................... | 375/325 |
| 6,175,550 | B1 | * | 1/2001 | van Nee ....................... | 370/206 |
| 6,218,896 | B1 | * | 4/2001 | Becker et al. ............... | 329/304 |
| 6,249,180 | B1 | * | 6/2001 | Maalej et al. ................ | 329/304 |
| 6,275,543 | B1 | * | 8/2001 | Petrus et al. .................. | 375/324 |
| 6,282,500 | B1 | * | 8/2001 | Agrawal et al. .............. | 702/72 |
| 6,421,399 | B1 | * | 7/2002 | Avidor et al. ................ | 375/329 |

FOREIGN PATENT DOCUMENTS

JP 05-041662 2/1993

OTHER PUBLICATIONS

Viterbi, A.J. and A.M. Viterbi, "Nonlinear Estimation of PSK–Modulated Carrier Phase with Application to Burst Digital Transmission," *IEEE Transactions on Information Theory* IT–29(4);543–551, Jul. 1983.

Fitz, M.P., "Equivocation in Nonlinear Digital Carrier Synchronizers," *IEEE Transactions o Communications* 39(11);1672–1682, Nov. 1991.

Fitz, M.P. and W.C. Lindsey, "Decision–Directed Burst–Mode Carrier Synchronization Techniques," *IEEE Transactions on Communications* 40(10);1644–1653, Oct. 1992.

Kim, M.S. et al, "Design and Analysis of Decision–Directed Carrier Recovery for High–Spee Satellite communications," *IEICE Transactions on Communications* E81–B(12):2567–2575, Dec. 1998.

\* cited by examiner

*Primary Examiner*—Young T. Tse
(74) *Attorney, Agent, or Firm*—Seed IP Law Group PLLC

(57) ABSTRACT

An apparatus and a method of decision-directed carrier recovery based on LMS method are provided. The apparatus of decision-directed carrier recovery based on LMS method includes frequency estimating device, phase estimating device, and complex number deciding device. The frequency estimating device compensates carrier frequency offset of external input signal and recovers carrier frequency of the input signal. The phase estimating device compensates phase offset of output signal resulted from the frequency estimating device and estimates carrier phase of the frequency estimated signal. The complex number deciding device determines a complex number for output signal resulted from the phase estimating device and provides the determined complex number to the frequency estimating device and the phase estimating device.

5 Claims, 3 Drawing Sheets

APPARATUS AND METHOD OF DECISION-DIRECTED CARRIER RECOVERY BASED ON LMS METHOD

TECHNICAL FIELD

The present invention relates to an apparatus and a method of decision-directed carrier recovery based on LMS method, which is appropriate for high speed satellite communication. In particular, the apparatus and the method in accordance with an embodiment of the present invention compensate frequency and phase of carrier by processing baseband signals at complex domain.

BACKGROUND OF THE INVENTION

Generally, in the demodulator of a digital wireless communication system, the angular frequency and the phase offsets that are contained in samples to be decided to the symbol data should be compensated.

Carrier components that are included in received signals are removed by local oscillators at intermediate frequency conversion part after passing through radio frequency receiving part. Even though carrier components are removed by this process, practically carrier frequency offset and phase offset exist. The remaining frequency and phase are detected and compensated at baseband for simple implementation of demodulators.

Since high intermediate frequencies and radio frequencies are utilized in satellite links, the narrower the bandwidth of information bearing signal, the more the signal is affected in the course of frequency down-conversion.

Therefore, a frequency synthesizer is required to convert the signal to the baseband signal correctly. On the contrary, the frequency deviation via the satellite link for wideband signals such as the QPSK (Quadrature Phase Shift Keying) signal with a transmission speed of more than 45 Mbps, can be controlled within 5,000 particles per million (PPM) times the symbol rate by using relatively accurate oscillators for burst-mode communications.

Many studies have been performed in order to improve compensation capability of carrier. In 1983, Viterbi and Viterbi proposed "nonlinear estimation of PSK modulation carrier phase with application to burst digital communication.", IEEE transactions on information theory, Vol. IT-32. But the algorithm proposed by Viterbi and Viterbi is disadvantageous in that noise gets significantly increased as M of the algorithm is increased.

In 1991, Fitz analyzed the equivocation problem in Viterbi and Viterbi scheme caused by M-th powering and suggested a solution for it at M. P. Fitz, "Equivocation in nonlinear digital carrier synchronizers", IEEE transactions on Communications, Vol. COM-39, No. 11.

However, the algorithm of Viterbi and Viterbi has a drawback of increasing noise levels excessively compared to the signal as M increases.

F. Classen, H. Meyer, and P. Sehier proposed estimators for frequency and phase by the decision-directed (DD) method and analyzed their performance at "In all feedforward synchronization unit for digital radio", Proceedings of VTC'93. Through this method doesn't employ VCO (voltage controlled oscillator). Though the scheme does not require any VCO, Read-Only Memory (ROM) tables are required in order to correspond the estimated phases to the complex values, In addition, Fitz suggested a decision-directed carrier synchronization technique for burst-mode modems, which can be applicable to TDMA (Time Division Multiple Access) at "Decision-directed burst-mode carrier synchronization techniques', IEEE transactions on communications, Vol. COM-40, No. 10, October 1992. In the scheme, the estimates for frequency require a divider instead of a VCO. Therefore, though it has a wide capture range of frequency, the calculation of division renders it unsuitable for high-speed transmissions.

In addition, though the scheme suggested by Classen and Fitz has fast acquisition performance, two determined symbols are used for frequency detection, which means one symbol error affects two continuous frequency detection and performance is deteriorated at low SNR (Signal to Noise Ratio).

M. S. Kim proposed a decision-directed carrier recovery scheme for high-speed satellite communications in burst modes at "Design and analysis of decision-directed carrier recovery for high-speed satellite communications", IEICE transactions on communications, Vol. E81-B, No. 12, December 1998. The scheme doesn't require any divider or VCO and uses only a decided symbol in obtaining frequency and phase estimates. In addition, regarding high-speed data communications, the scheme has 5,000 PPM [Hz/symbol] in the frequency capture range. Following equation 1 illustrates AR (autoregressive)-AR (autoregressive) model frequency estimator, phase estimator, and total estimator.

$$\hat{\Omega}_{AR,k} = \beta \hat{\Omega}_{AR,k-1} + (1-\beta)\hat{e}_{\omega,k} \cong e^{j(k\omega_0 + \theta_0)}\frac{(1-\beta)}{1-\beta e^{j\omega_0}} \quad \text{[Equation 1]}$$

$$\hat{\Phi}_{AR,k} = \gamma \hat{\Phi}_{AR,k-1} + (1-\gamma)\hat{e}_{\theta,k} \cong e^{j\omega_0}\frac{(1-\beta)}{1-\beta e^{j\omega_0}}$$

$$\hat{R}_{AR,k+1} \equiv \hat{\Omega}_{AR,k}\hat{\Phi}_{AR,k} \cong e|1-\beta e^{j\omega_0}|^2$$

where, $\beta,\gamma$ are positive numbers within the range (0,1) for controlling noise bandwidth and make influence on phase estimator, frequency estimator, and total estimator. This scheme has a drawback that the total estimator is too sensitive to the amplitude of the recovered signal as the amount of frequency offsets increases.

SUMMARY OF THE INVENTION

An apparatus and a method of decision-directed carrier recovery based on LMS method are provided.

The apparatus of decision-directed carrier recovery based on LMS method in accordance with an embodiment of the present invention includes frequency estimating means, phase estimating means, and complex number deciding means.

The frequency estimating means compensates a carrier frequency offset of an external input signal and recovers a carrier frequency of the input signal. The phase estimating means compensates a phase offset of an output signal outputted from the frequency estimating means and estimates a carrier phase of the frequency offset compensated signal. The complex number deciding means determines a complex number for an output signal outputted from the phase estimating means and provides the determined complex number to the frequency estimating means and the phase estimating means.

Preferably, the frequency estimating means includes first conjugate complex number generating means, first multiplying means, averaging means, second conjugate complex number generating means, and second multiplying means. The first conjugate complex number generating means receives the complex number from the complex number deciding means and generates first conjugate complex number. The first multiplying means multiplies the external input signal by the first conjugate complex number. The averaging means averages an output signal of the first multiplying means. The second conjugate complex number generating means receives the output of the averaging means and generates a second conjugate complex number. The second multiplying means multiplies the external input signal by the second conjugate complex number and generates a frequency offset compensated signal.

Preferably, the averaging means includes a low pass filter for averaging the output signal of the first multiplying means.

Preferably, the phase estimating means comprises includes third conjugate complex number generating means, third multiplying means, parameter generating means, fourth multiplying means, accumulating means, fourth conjugate complex number generating means, fifth multiplying means, and adding means. The third conjugate complex number generating means receives the complex number from the complex number deciding means and generates a third conjugate complex number. The third multiplying means multiplies the frequency offset compensated signal by the third conjugate complex number. The frequency offset compensated signal is output of the second multiplier of the frequency estimating means. The parameter generating means generates a control parameter. The fourth multiplying means multiplies an output of the third multiplying means by the control parameter. The accumulating means accumulates an output of the fourth multiplying means. The fourth conjugate complex number generating means receives an output of the accumulating means and generates a fourth conjugate complex number. The fifth multiplying means multiplies the fourth conjugate complex number by the frequency offset compensated signal. The adding means adds an output of the complex number deciding means to an output of the fifth multiplying means and generates an output of the addition to the third conjugate complex number generating means.

A method of decision-directed carrier recovery based on LMS method in accordance with an embodiment of the present invention includes a frequency estimating step, a carrier phase estimating step, and a complex number deciding step. The frequency estimating step compensates a carrier frequency offset of an external input signal and thereby recovers a carrier frequency of the input signal. The carrier phase estimating step compensates a phase offset of the frequency offset compensated signal and thereby recovers a carrier phase of the input signal. The complex number deciding step determines a complex number for the phase recovered signal and executes the frequency estimating step and the carrier phase estimating step.

Preferably, the frequency estimating step includes a first conjugate complex number generating step, a first multiplying step, an averaging step, a second conjugate, complex number generating step, and a second multiplying step. The first conjugate complex number generating step receives the complex number and generates a first conjugate complex number. The first multiplying step multiplies the external input signal by the first conjugate complex number and generates a first multiplied signal. The averaging step averages the first multiplied signal and generates an average signal. The second conjugate complex number generating step receives the average signal and generates a second conjugate complex number. The second multiplying step multiplies the external input signal by the second conjugate complex number and generates a second multiplied signal.

Preferably, the carrier phase estimating step includes a third conjugate complex number generating step, a third multiplying step, a parameter generating step, a fourth multiplying step, an accumulating step, a fourth conjugate complex number generating step, a fifth multiplying step, and an adding step. The third conjugate complex number generating step receives the complex number and generates a third conjugate complex number. The third multiplying step multiplies the frequency offset compensated signal by the third conjugate complex number and generates a third multiplied signal. The parameter generating step generates a control parameter. The fourth multiplying step multiplies the third multiplied signal by the control parameter and generates a fourth multiplied signal. The accumulating step accumulates the fourth multiplied signal and generates an accumulated signal. The fourth conjugate complex number generating step receives the accumulated signal and generates a fourth conjugate complex number. The fifth multiplying step multiplies the fourth conjugate complex number by the frequency offset compensated signal and generates a fifth multiplied signal. The adding step adds the complex number to the fifth multiplied signal and returns to the third conjugate complex number generating step.

BRIEF DESCRIPTION OF THE DRAWINGS

The embodiments of the present invention will be explained with reference to the accompanying drawings, in which.

DETAILED DESCRIPTION OF THE INVENTION

Figure 1:
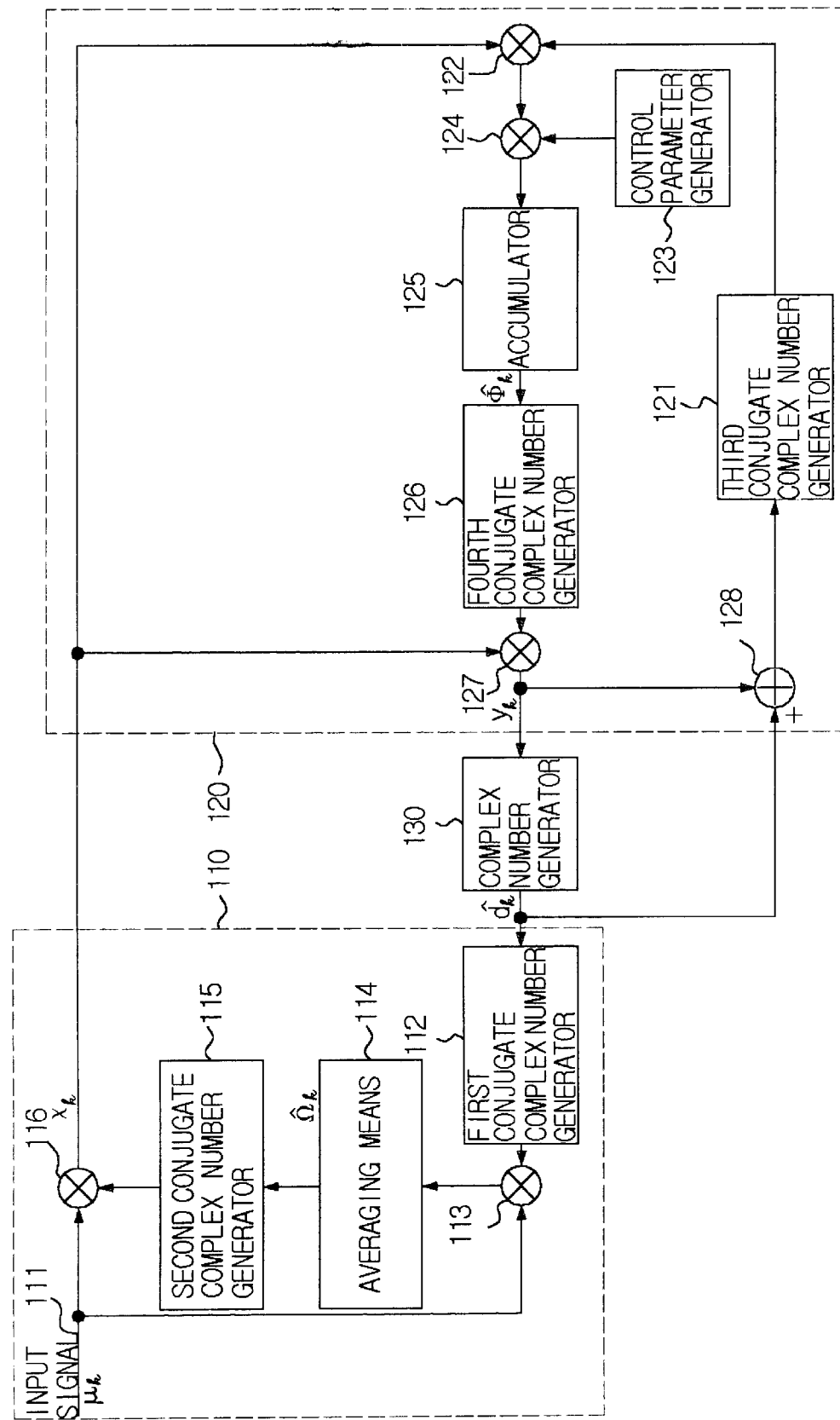
FIG. 1 is a block diagram illustrating an apparatus of decision-directed carrier recovery based on LMS method in accordance with an embodiment of the present invention.

FIG. 1 is a block diagram illustrating an apparatus of decision-directed carrier recovery based on LMS method in accordance with an embodiment of the present invention.

As shown in FIG. 1, the apparatus of decision-directed carrier recovery in accordance with an embodiment of the present invention includes frequency estimator 110, phase estimator 120, and complex number decider 130.

The frequency estimator 110 compensates carrier frequency offset of external input signal 111 and recovers carrier frequency of the input signal. The phase estimator 120 compensates phase offset of output signal resulted from the frequency estimator 110 and estimates carrier phase of the frequency offset compensated signal. The complex decider 130 determines a complex number for output signal resulted from the phase estimator 120 and provides the determined complex number to the frequency estimator 110 and the phase estimator 120.

In addition, the frequency estimator 110 includes first conjugate complex number generator 112, first multiplier 113, averaging means 114, second conjugate complex number generator 115, and second multiplier 116. The first conjugate complex number generator 112 receives the complex number from the complex decider and generates first conjugate complex number of the complex number. The first multiplier 113 multiplies the external input by the first conjugate complex number. The averaging means averages 114 output of the first multiplier. The second conjugate complex number generator 115 receives output of the averaging means and generates second conjugate complex number. The second multiplier 116 multiplies the external input by the second conjugate complex number and generates frequency offset compensated signal. Here, the averaging means 114 includes a low pass filter for averaging output signal of the first multiplier 113.

The phase estimator 120 includes third conjugate complex number generator 121, third multiplier 122, control parameter generator 123, fourth multiplier 124, accumulator 125, fourth conjugate complex number generator 126, fifth multiplier 127, and adder 128. The third conjugate complex number generator 121 receives the complex number from the complex decider and generates third conjugate complex number of the complex number. The third multiplier 112 multiplies the frequency offset compensated signal by the third conjugate complex number. The frequency offset compensated signal is output of the second multiplier 116 of the frequency estimator 110. The control parameter generator 123 generates a control parameter. The fourth multiplier 124 multiplies output of the third multiplier 122 by the control parameter. The accumulator 125 accumulates output of the fourth multiplier 124. The fourth conjugate complex number generator 126 receives output of the accumulator and generates fourth conjugate complex number. The fifth multiplier 127 multiplies the fourth conjugate complex number by frequency offset compensated signal. The frequency offset compensated signal is output of the second multiplier 116 of the frequency estimator 110. The adding means 128 adds output of the complex number deciding means 130 to output of the fifth multiplier 127 and generates output of the addition to the third conjugate complex number generator 121.

The frequency estimator 110 performs frequency estimation and recovery and the phase estimator 120 estimates and recovers phase caused by frequency offset.

Carrier $x_k$ of input signal in response to MPSK (M-ary Phase Shift Keying) signal is described at equation 2.

$$x_k = e^{j(\omega_0 k + \theta_0)} d_k + n_k \quad \text{[Equation 2]}$$

$\omega_0$: angular frequency offset $\theta_0$: the unknown carrier phase on $[-\pi, \pi]$ $d_k \in \{e^{j2\pi l/M}, l=0,1,\ldots,M-1\}$: data symbol of MPSK signals $n_k$: white Gaussian noise with a double-sided power spectral density of $n_0/2$ Frequency estimator 110 and phase estimator 120 are described in equation 3.

$$\hat{e}_{\omega,k} = u_k \hat{d}^*_k$$

$$\hat{e}_{\theta,k} = x_k \hat{d}^*_k \quad \text{[Equation 3]}$$

$x_k$: output sample in which frequency offset is removed.

$\hat{d}_k$: tentative decided symbol data at time k

Output sample $x_k$ of frequency estimator 110 and output sample $y_k$ of phase estimator 120 are described in equation 4.

$$x_k = u_k \hat{\Omega}^*_{k-1}$$

$$y_k = x_k 101^*_{k-1} \quad \text{[Equation 4]}$$

$\hat{\Phi}_{k-1}, \hat{\Phi}_{k-1}$: frequency estimator and phase estimator at time k-1, respectively.

Output sample may be represented as $y_k = u_k \hat{R}'_k$ and the total estimator to obtain phase estimator and frequency estimator is described in equation 5.

$$\hat{R}_k = \hat{\Phi}_{k-1} \hat{\Phi}_{k-1} \quad \text{[Equation 5]}$$

Consequently, frequency estimator and phase estimator for the proposed AR (autoregressive)-LMS (least mean square) model of the present invention are described in equation 6 and equation 7, respectively.

$$\hat{\Omega}_k = \zeta \hat{\Omega}_{k-1} + (1-\zeta) \hat{e}_{\omega,k} \quad \text{[Equation 6]}$$

$$e_k = \hat{d}_k - y_k$$

$$\hat{\Phi}_k = \hat{\Phi}_{k-1} + (1-\mu) x_k e^*_k \quad \text{[Equation 7]}$$

In equation 6 and equation 7, $\beta, \gamma, \zeta, \mu$ are positive numbers within the range of (0, 1) to control the noise bandwidth and they affect the acquisition performance of the phase estimator, frequency estimator and total estimators.

On the other hand, in the steady state with sufficiently large k in the absence of noise, the frequency estimator and the phase estimator in accordance with AR (autoregressive)-LMS (least mean square) model of the present invention are described in equation 8 and equation 9, respectively.

$$\hat{\Omega}_k = \frac{(1-\zeta)e^{j(k\omega_0+\theta_0)}}{1-\zeta e^{-j\omega_0}} \quad \text{[Equation 8]}$$

$$\hat{\Phi}_k = \frac{(1-\zeta e^{-j\omega_0})e^{j\omega_0}}{1-\zeta} \quad \text{[Equation 9]}$$

As shown in equation 8 and equation 9, the frequency offset $\omega_0$ affects the magnitudes of the frequency estimator in accordance with an embodiment of the present invention. In case that $\beta=\zeta$, the effects on frequency estimator are the same for two models. The phase estimator is affected by frequency offset $\omega_0$, not by initial phase offset $\theta_0$.

Also, the phase estimator do not depend on the parameters $\gamma, \mu$ but on other parameters $\beta, \zeta$ used in the frequency estimator in the steady state, The amplitude of the total estimator in the AR-AR model decrease as the amount of frequency offset and $\beta$ increases, while those of the AR-LMS model is maintained independent of frequency offset and parameter $\zeta$. Total estimator of AR-LMS model in accordance with an embodiment of the present invention with phase offset $\theta_0$ and frequency offset $\omega_0$ is described in equation 10.

$$\hat{R}_{k+1} = e^{j[(k+1)\omega_0+\theta_0]} \quad \text{[Equation 10]}$$

The total estimator shown in equation 10 estimates the frequency and the phase components contained at time k+1 from the frequency estimator $107_k$ and phase estimator $\hat{\Phi}_k$ at time k.

Figure 2A:
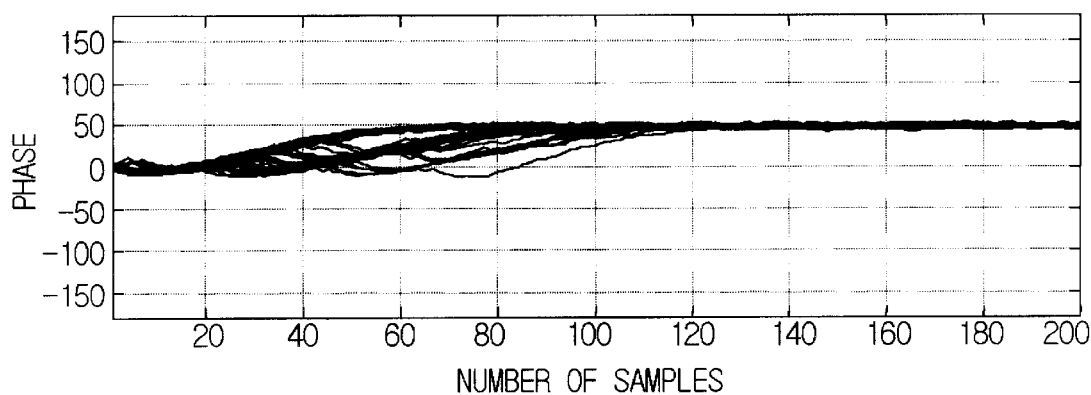
FIGS. 2A and 2B are graphs illustrating results of simulations with a purpose of showing performance of an apparatus of decision-directed carrier recovery based on LMS method in accordance with an embodiment of the present invention.
Figure 2B:
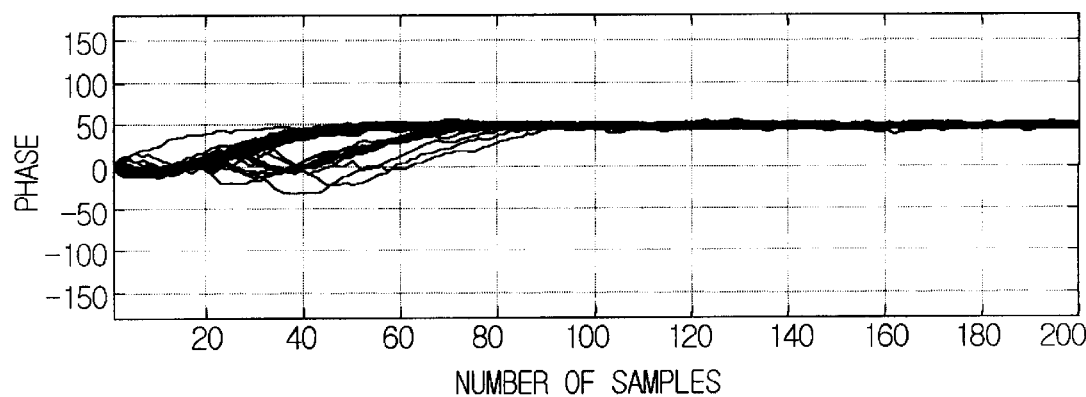

FIGS. 2A and 2B are graphs illustrating results of simulations with a purpose of showing performance of an apparatus of decision-directed carrier recovery based on LMS method in accordance with an embodiment of the present invention. For comparing the performance, parameters values in the steady state at QPSK (quadrature phase shift keying) system are set as $\beta=\gamma=\zeta=\mu=0.94$. Normalized frequency offset is set as g, $f_0=10^{-2}$ [Hz/symbol]. Phase offset is set as $\theta_{0=\pi/4}$ and SNR (signal to noise ratio) is set as $E_b/N_0=7$[dB]. FIG. 2A illustrates simulation result of recovering apparatus in accordance with AR-AR model of equation 1. FIG. 2B illustrates simulation result of recovering apparatus in accordance with AR-LMS model.

Figure 3A:
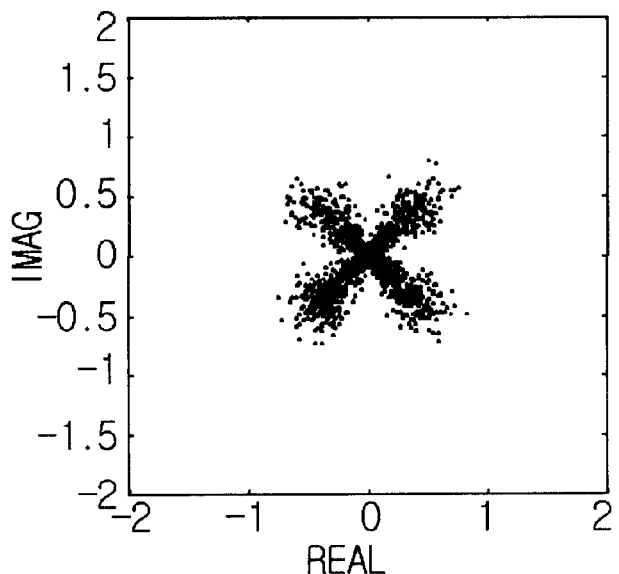
FIGS. 3A and 3B are graphs illustrating tracking results of simulations with a purpose of showing performance of an apparatus of decision-directed carrier recovery based on LMS method in accordance with an embodiment of the present invention.
Figure 3B:
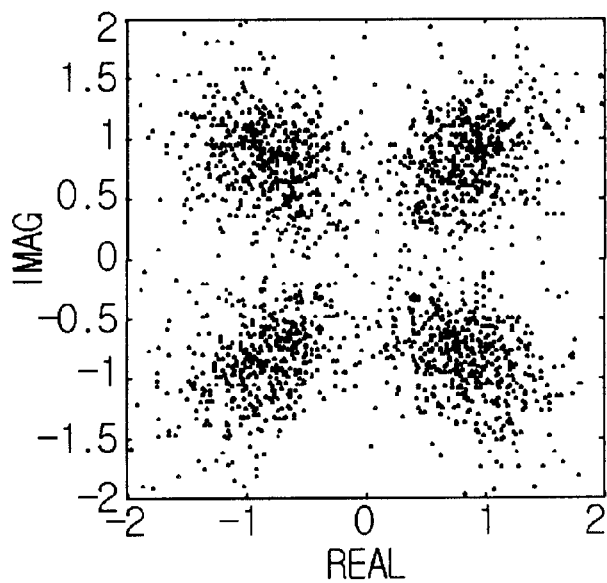

FIGS. 3A and 3B are graphs illustrating tracking results of simulations with a purpose of showing performance of an apparatus of decision-directed carrier recovery based on LMS method in accordance with an embodiment of the present invention.

$$u_k = (1+0.35 \sin(2\pi k/500))e^{j(\omega_0 k+\theta_0)} d_k + n_k \quad \text{[Equation 11]}$$

For comparing the performance, parameters values in the steady state at QPSK (quadrature phase shift keying) system are set as $\beta=\gamma=\zeta=\mu=0.94$. Normalized frequency offset is set as $f_0=10^{-2}$[Hz/symbol]. Phase offset is set as $\theta_0=\pi/4$ and SNR (signal to noise ratio) is set as $E_b/N_0=7$[dB].

As shown in FIG. 3A, signal recovered by AR-AR model is deteriorated and decreased. On the contrary, as shown in FIG. 3B, even though signal recovered by AR-LMS model includes some distortion, it shows improved quality in comparison with the signal recovered by AR-AR model.

As described above, the method in accordance with an embodiment of the present invention employs low pass filters and processes baseband signals in complex domain, which is different from conventional methods with PLL (phase locked loop) or with dividers. As a result, complexity in terms of implementation is decreased and noise caused at carrier loop is significantly suppressed. In addition, since carrier recovering apparatus in accordance with an embodiment of the present invention uses LMS (least mean square) algorithm at phase estimator, the magnitude of the total estimator for estimating frequency and phase offset becomes independent of the frequency offset. Therefore, the frequency capture range of the present invention becomes more widened than the conventional method.

The apparatus of decision-directed carrier recovery based on LMS method proposed by the present invention has a merit of consisting of simple arithmetic operations in implementation and has fast acquisition performance for static channels. Also, it is suitable for wireless communications such as LMDS (local multipoint distribution service) and high speed satellite communications with static channels.

Although representative embodiments of the present invention have been disclosed for illustrative purpose, those who are skilled in the art will appreciate that various modifications, additions and substitutions are possible without departing from the scope and spirit of the present invention as defined in the accompanying claims.

We claim:

1. An apparatus of decision-directed carrier recovery based on LMS method, comprising:

frequency estimating means for compensating a carrier frequency offset of an external input signal and recovering a carrier frequency of the input signal;

phase estimating means for compensating a phase offset of an output signal outputted from the frequency estimating means and estimating a carrier phase of the frequency offset compensated signal; and complex number deciding means for determining a complex number for an output signal outputted from the phase estimating means and providing the determined complex number to the frequency estimating means and the phase estimating means, wherein the frequency estimating means comprises:

first conjugate complex number generating means for receiving the complex number from the complex number deciding means and generating a first conjugate complex number;

first multiplying means for multiplying the external input signal by the first conjugate complex number;

averaging means for averaging an output signal of the first multiplying means;

second conjugate complex number generating means for receiving the output of the averaging means and generating a second conjugate complex number; and second multiplying means for multiplying the external input signal by the second conjugate complex number and generating the frequency offset compensated signal.

2. The apparatus of claim 1, wherein the averaging means includes a low pass filter for averaging the output signal of the first multiplying means.

3. The apparatus of claim 1, wherein the phase estimating means comprises:

third conjugate complex number generating means for receiving the complex number from the complex number deciding means and generating a third conjugate complex number;

third multiplying means for multiplying the frequency offset compensated signal by the third conjugate complex number, the frequency offset compensated signal being output of the second multiplying means of the frequency estimating means;

parameter generating means for generating a control parameter;

fourth multiplying means for multiplying an output of the third multiplying means by the control parameter;

accumulating means for accumulating an output of the fourth multiplying means;

fourth conjugate complex number generating means for receiving an output of the accumulating means and generating a fourth conjugate complex number;

fifth multiplying means for multiplying the fourth conjugate complex number by the frequency offset compensated signal; and adding means for adding an output of the complex number deciding means to an output of the fifth multiplying means and generating an output of the addition to the third conjugate complex number generating means.

4. A method of decision-directed carrier recovery based on LMS method, comprising:

a frequency estimating step for compensating a carrier frequency offset of an external input signal and thereby recovering a carrier frequency of the input signal;

a carrier phase estimating step for compensating a phase offset of the frequency offset compensated signal and thereby recovering a carrier phase of the input signal;

a complex number deciding step for determining a complex number for the phase recovered signal and executing the frequency estimating step and the carrier phase estimating step, wherein the frequency estimating step comprises:

a first conjugate complex number generating step for receiving the complex number and generating a first conjugate complex number;

a first multiplying step for multiplying the external input signal by the first conjugate complex number and generating a first multiplied signal;

an averaging step for averaging the first multiplied signal and generating an average signal;

a second conjugate complex number generating step for receiving the average signal and generating a second conjugate complex number; and a second multiplying step for multiplying the external input signal by the second conjugate complex number and generating the frequency offset compensated signal as a second multiplied signal.

5. The method of claim 4, wherein the carrier phase estimating step comprises:

a third conjugate complex number generating step for receiving the complex number and generating a third conjugate complex number;

a third multiplying step for multiplying the frequency offset compensated signal by the third conjugate complex number and generating a third multiplied signal;

a parameter generating step for generating a control parameter;

a fourth multiplying step for multiplying the third multiplied signal by the control parameter and generating a fourth multiplied signal;

an accumulating step for accumulating the fourth multiplied signal and generating an accumulated signal;

a fourth conjugate complex number generating step for receiving the accumulated signal and generating a fourth conjugate complex number;

a fifth multiplying step for multiplying the fourth conjugate complex number by the frequency offset compensated signal and generating a fifth multiplied signal; and an adding step for adding the complex number to the fifth multiplied signal and returning to the third conjugate complex number generating step.

* * * * *